Aug. 29, 1967 YOSHIHARA KOIZUMI ETAL 3,339,064

DECIMAL ADDITION SYSTEM

Filed Aug. 11, 1966 2 Sheets-Sheet 1

INVENTORS
YOSHIHARU KOIZUMI
MASATERU TAKAGI

BY

Hopgood & Calimafde
ATTORNEYS

INVENTORS
YOSHIHARA KOIZUMI
MASATERU TAKAGI
BY
Hopgood & Calimafde
ATTORNEYS

United States Patent Office 3,339,064

Patented Aug. 29, 1967

3,339,064

DECIMAL ADDITION SYSTEM

Yoshihara Koizumi and Masateru Takagi, Tokyo, Japan, assignors to Nippon Electric Company Limited, Tokyo, Japan, a corporation of Japan Filed Aug. 11, 1966, Ser. No. 575,919
Claims priority, application Japan, Sept. 28, 1962, 37/42,418
6 Claims. (Cl. 235—169)

This invention relates to an improved electrical decimal addition system, and in particular to a binary coded decimal (hereinafter referred to as BCD) addition system.

This application is a continuation-in-part of copending application Ser. No. 311,135, filed Sept. 24, 1963, now abandoned.

It is an object of this invention to provide an improved decimal addition system which is capable of functioning at a higher operating speed than conventional systems, the rate of speed being substantially the order of that now achieved in binary adding operations.

Figure 1:
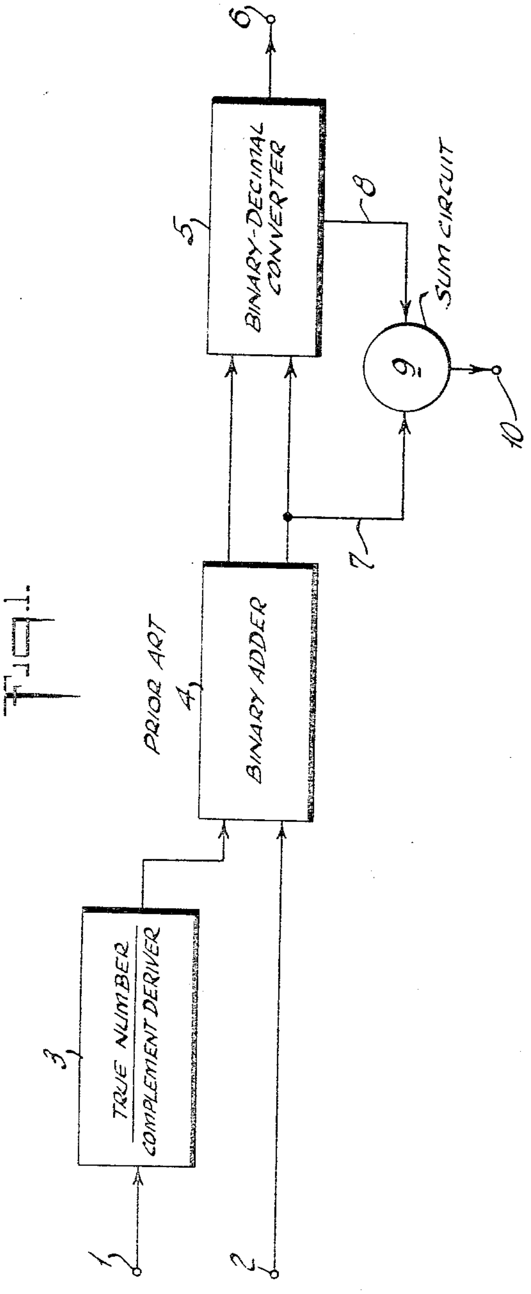
Figure 2:
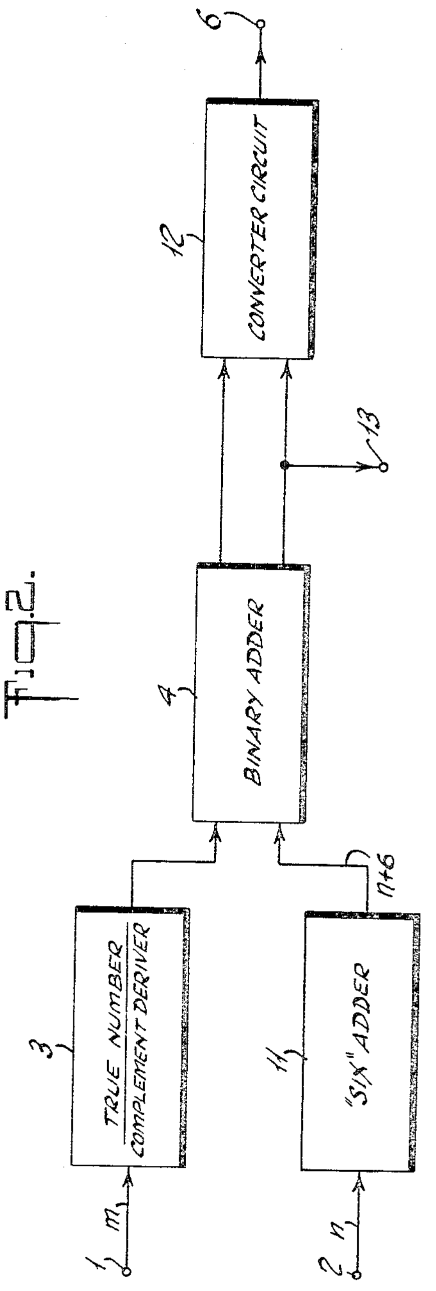
Figure 3:
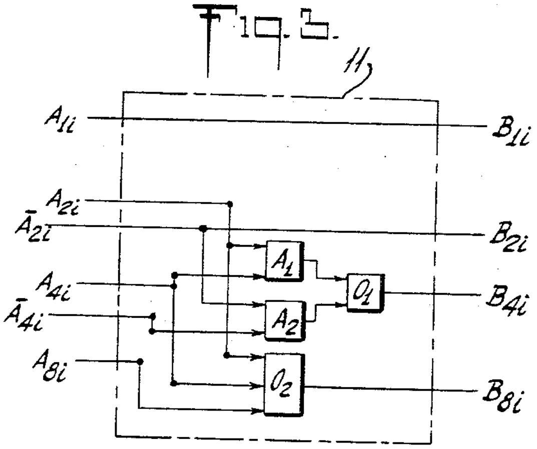
Figure 4:
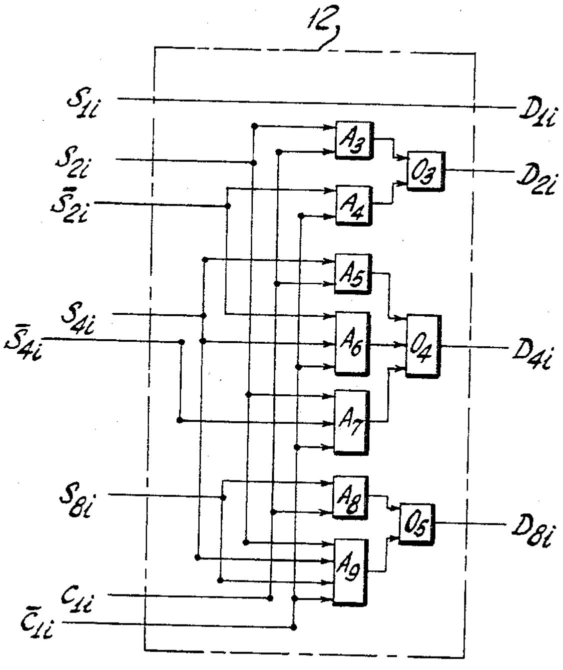

All of the objects, features and advantages of this invention and the manner of attaining them will become more apparent and the invention itself will be best understood by reference to the following description of an embodiment of the invention taken in conjunction with the accompanying drawing, in which FIG. 1 shows a conventional electrical decimal addition system, FIG. 2 illustrates a decimal addition system which embodies the principles of this invention, FIG. 3 illustrates one circuit which may be employed as the auxiliary adder of FIG. 2, and FIG. 4 illustrates one circuit which may be employed as the converter circuit of FIG. 2.

In order to lay a proper foundation for an understanding of the invention, a conventional system will first be briefly described. Referring to FIG. 1, the conventional decimal addition system shown therein includes an input 1 for receiving an addend, an input 2 for receiving an augend, a true number complement deriver 3, a binary adder 4, a binary-decimal converter 5, an output 6 for providing a sum in the BCD code, paths 7 and 8 for the carry signals, and a logical summer 9 for summing the carry signals in the paths 7 and 8. The logical sum from the summer 9 becomes the carry signal which is sent out via a terminal 10 to be added to the more significant digit. By means of this arrangement, the operation of the above circuit being successively performed at every digit as is well known to those skilled in the art, the addition will be accomplished. In this arrangement, however, the adding speed is limited by the number of logical stages for detecting the carry from one digit to the more significant digit, and accordingly, particularly in a parallel adder system, it is difficult to achieve higher adding speeds because the circuit construction becomes rather complicated.

As the BCD code (i.e. the 8, 4, 2, 1 code) represents each decimal digit by four binary digits, where the code is applied to the binary adder, a carry will be performed for the number 16. However, the performance of a carry for the number 10 necessitates complex circuitry and lengthened operational time as is well-known, and consequently, the operational speed will be limited.

Briefly, the invention is promulgated upon the concept of adding the number six to the augend or addend and converting to the proper result in the BCD code. This will be further explained in detail by considering that the addend and augend of each decimal digit are $m$ and $n$, respectively, where $m$ and $n$ are positive integers which can have any value between 0 and 9. An instance will now be considered where the carry function is to be performed. The condition existing for the carry is:

$$m \geqq 10-n \quad (1)$$

Assuming the value of $m$ to be $$m=10-n+p \quad (2)$$

(where $p$ is the difference between the sum of $m+n$ and 10)

Adding $m+n$:

$$m+n=10-n+p+n=10+p \quad (3)$$

Thus, the quantity 10 of the expression (3) becomes the carry signal.

The detection of the carry signal is very difficult as a practical matter and also requires a relatively long time. Consequently, in accordance with the principles of this invention, the number of quantity "six" is added to the augend $n$. Accordingly, the following expression is produced:

$$n+6+m=m+6+10-n+p=16+p \quad (4)$$

Thus, the number 16 is available as a carry indication for any resultant sum $\geqq 10$. Hence the binary adder 4 is capable of performance without modification and the detection and operation of this carry signal is performed rapidly. If no carry results, though the number six is added to the augend $n$, and the augend is added to the addend $m$, the expression $n+6+m$ results and it becomes necessary to subtract 6 from the result to convert to the proper sum, as follows:

$$n+6+m-6=m+n \quad (5)$$

This conversion is performed when the absence of the carry signal is detected.

Referring now to FIG. 2, which illustrates one embodiment of the invention, like numerals designate corresponding parts to those shown in FIG. 1. An addend $m$ from the input 1 is fed to the binary adder 4 via a true number complement deriver 3, while the augend $n$, from the input 2, has added to its value the number six by virtue of an auxiliary adder 11. The resulting output $n+6$ is also applied to the binary adder 4. In the event of the existence of a carry signal in the output of the binary adder 4, this carry signal is available to be applied to the more significant digit via terminal 13. The output of the binary adder circuit 4 is also applied to a converter circuit 12, which also detects whether a carry signal is present or not. This latter circuit performs conversion either by adding zero to the sum if a carry signal is present or by subtracting six from the sum in the absence of a carry signal. Consequently, the correct sum in BCD form is available at the output 6 of FIG. 2.

While the addition of single decimal digits has been described above, the addition of a greater number of integers may also be achieved in a similar manner by means of adding the number six to the augend of each digit, as will be clear to those skilled in the art.

Further details concerning the addition of the number six in the auxiliary adder circuit 11 will now be explained. Assuming that $A_{ji}$ is a logical indication of a bit having the weight $j$ for the $i$th digit of the BCD code, four bits of the $i$th digit are expressed by:

$$A_{8i}, A_{4i}, A_{2i}, A_{1i} \quad (6)$$

If the bits resulting from the number six being added to this digit are expressed as $$B_{8i}, B_{4i}, B_{2i}, B_{1i} \quad (7)$$

the logical functions produced by adding the number 6 are as follows (overline indicates complement):

$$\begin{aligned} B_{1i} &= A_{1i} \\ B_{2i} &= \overline{A}_{2i} \\ B_{4i} &= A_{2i} \cdot A_{4i} + \overline{A}_{2i} \cdot \overline{A}_{4i} \\ B_{8i} &= A_{2i} + A_{4i} + A_{8i} \end{aligned} \quad (8)$$

The circuit which satisfies the logical functions expressed in the Equation 8, for adding six to each decimal digit to produce the desired result, is the auxiliary adder circuit 11. This circuit may easily be derived from the above equation by those skilled in the art.

The binary adder 4 is an adder circuit for the binary digits corresponding to one of the decimal digits, expressed by BCD form. The carry detector, which may be simply the fifth binary digit in the adder, delivers a carry indication to the converter circuit 12 and to the terminal 13 (the latter for the more significant digit).

The converter 12 is a circuit in which conversion is performed either by adding zero to the four bits corresponding to the respective decimal digit or by subtracting the number six from them, depending on the presence or absence of the carry signal, as described above. Assuming that we are again dealing with the $i$th digit of the BCD code; that a carry signal from the binary adder 4 is expressed by $C_i$; and that the sum from adder 4 is expressed by $S_{ji}$, in which the weight of the bit is signified by $j$, the four bits of the $i$th digit will be $$S_{8i}, S_{4i}, S_{2i}, S_{1i} \quad (9)$$

If the bit which has the weight $j$ of the $i$th digit of the *converted* result (output of circuit 12) is expressed by $D_{ji}$, the four output bits of the $i$th digit will be:

$$D_{8i}, D_{4i}, D_{2i}, D_{1i} \quad (10)$$

Consequently, the logical operation in the converter 12 will be performed as follows:

$$\begin{aligned} D_{1i} &= S_{1i} \\ D_{2i} &= C_i \cdot S_{2i} + \overline{C}_i \cdot \overline{S}_{2i} \\ D_{4i} &= C_i \cdot S_{4i} + \overline{C}_i (\overline{S}_{4i} \cdot S_{2i} + S_{4i} \cdot \overline{S}_{2i}) \\ D_{8i} &= C_i \cdot S_{8i} + \overline{C}_i \cdot S_{8i} \cdot S_{4i} \cdot S_{2i} \end{aligned} \quad (11)$$

The circuit which satisfies the logical functions expressed in Equation 11, for subtracting six from each decimal digit where no carry is indicated, is the converter 12. This circuit also may be easily derived from the equation by those skilled in the art.

While the addition of six to the augend $n$ has been described throughout the above description, it is to be clearly understood that a similar result can be obtained by adding six to the addend $m$ instead. Also, as those knowledgeable in the art are aware, addition performed after deriving the complement of the augend or addend results in the performance of a subtracting operation. Hence, the addition of circuit 3 in FIGS. 1 and 2 allows sufficient flexibility to the devices for either addition or subtraction.

FIG. 3 shows one circuit for the auxiliary adder 11 of FIG. 2 according to this invention, and FIG. 4 shows a circuit that may be employed as the converter circuit 12 of FIG. 2 according to the invention. In both FIGS. 3 and 4, the bits of numerical information indicated by the various alphabetical symbols correspond to those discussed in the foregoing numbered equations.

The circuit of the auxiliary adder 11 shown in FIG. 3 includes AND gates $A_1$ and $A_2$ for receiving bits of numerical information indicated by the symbols on the left side of the figure. These two AND gates $A_1$ and $A_2$ have their outputs connected to an OR gate $O_1$.

An OR gate $O_2$ is provided for receiving selected bits of information fed to the AND gates $A_1$ and $A_2$ and also one bit $A_{8i}$ not fed to these latter gates. The bit $A_{1i}$ is fed directly through the auxiliary adder 11. The bits of numerical information produced at the output of the auxiliary adder 11 are indicated by the symbols at the right side of FIG. 3.

The converter circuit 12 shown in FIG. 4 includes a first group of AND gates $A_3$ and $A_4$ for receiving bits of numerical information indicated by the symbols on the left side of this figure. The outputs of these AND gates $A_3$ and $A_4$ are fed to an OR gate $O_3$. A second group of AND gates $A_5$, $A_6$ and $A_7$ is also provided for receiving still other bits of information, the outputs of these gates being connected to another OR gate $O_4$. Yet a third group of AND gates $A_8$ and $A_9$ is provided for receiving selected bits of information fed to the first and second groups of AND gates and also another bit $S_{8i}$. The output of this last group of AND gates comprising $A_8$ and $A_9$ is fed to another OR gate $O_5$. The bit $S_{1i}$ is fed directly through the converter circuit 12. The bits of information produced at the output of the converter circuit 12 are indicated by the symbols at the right side of FIG. 4.

The operation of the auxiliary adder circuit 11 illustrated in FIGS. 2 and 3 will now be described. Assuming the input of the auxiliary adder to be 7, and adding 7+6:

$$7+6=13$$

The binary addition of this expression is as follows:

$$0111+0110=1101$$

Thus, the input to the auxiliary adder, 0111, is converted to 1101 by this adder. It will be seen that the adder operates to convert the input into a signal wherein the value 6 is added to the input value in the BCD code. The circuit of FIG. 3 is capable of performing the above converting operation for each figure from 0 through 9.

The operation of the converter circuit 12 illustrated in FIGS. 2 and 4 will now be described. Considering four bits corresponding to a respective decimal digit counter, it is found from the Equations 3 and 4 above that these four bits are (a) the summed output itself shown in the BCD code in the case of a carry signal and (b) the summed output shown in the BCD code plus 6 in excess when there is no carry signal.

Accordingly, the above values may be decreased by 6 in order to obtain the correct summed output. Expressed in concrete values, if the output of the adder is 0111, it is not converted in the case of taking a carry signal and therefore, the value 0111, becomes the summed output itself. On the other hand, in case of no carry signal, it is converted as described above. The circuit of FIG. 4 is capable of performing such operation for all the outputs of the adder 4.

From the foregoing, it will be seen that by employing BCD addition according to the invention the carry is no longer a major restriction on the speed of the arithmetic operation. Furthermore, since the logic circuitry is simplified, addition can be performed at substantially the same speed as in binary addition.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. In a binary coded decimal adder having a pair of inputs for the augend and addend and a binary adder coupled to said inputs, the improvement therein for effecting the carry comprising means connected between one of said inputs and said binary adder for adding the number six to each digit applied to said one input, means in said binary adder for indicating a carry, converter means connected to said indicating means and coupled to said binary adder for subtracting six from the output of said binary adder in the absence of a carry indication, said converter means including a first group of first and second AND gates for receiving different bits of information and having their outputs connected to a first OR gate, said converter means further including a second group of third, fourth and fifth AND gates for receiving still other bits of information and having their outputs connected to a second OR gate, said converter means still further including a third group of sixth and seventh AND gates for receiving selected bits of information fed to said first and second groups and also one other bit not fed to said latter-mentioned groups, and said sixth and seventh AND gates having their outputs connected to a third OR gate.

2. The binary coded decimal adder as claimed in claim 1 adapted to serve the subtraction function further comprising a complement deriver connected between the other of said inputs and said binary adder.

3. An electric decimal addition system for adding first and second numerical quantities together comprising a complement deriver, means for feeding one of said numerical quantities to said complement deriver, a binary adder, means for feeding the output of said complement deriver to said binary adder, means for adding the number six to each digit of the other to said numerical quantities to produce a resultant quantity, the number six adding means including first and second AND gates for receiving different bits of information and having their outputs connected to a first OR gate, said number six adding means also including a second OR gate for receiving selected bits of information fed to said first and second AND gates and also another bit not fed to said latter-mentioned gates, means for feeding said resultant quantity to said binary adder whereby said binary adder combines said resultant quantity with the output from said complement deriver to produce a sum output which may include a carry quantity depending upon the values of said numerical quantities, and converter means for detecting the presence of said carry quantity, said converter means also being adapted to subtract the number six from each digit of said sum output in the absence of said quantity at the output of said binary adder, whereby an answer is provided at the output of said converter means.

4. The invention described in claim 3 wherein said number six adding means comprises an auxiliary adder.

5. An electrical decimal addition system comprising a complement deriver for receiving a first numerical quantity, an auxiliary adder for receiving a second numerical quantity and adding the number six to each digit thereof, said auxiliary adder including a first group of first and second AND gates for receiving different bits of numerical information and having their outputs connected to a first OR gate, said auxiliary adder also including a second OR gate for receiving selected bits of information fed to said first group of AND gates and also another bit not fed to said latter-mentioned group, a binary adder for adding the output from said complement deriver and the output from said auxiliary adder to produce a sum output which may include a carry signal depending upon the values of said numerical quantities, a converter for detecting the presence of said carry signal, said converter including a second group of first and second AND gates for receiving different bits of numerical information and having their outputs connected to a third OR gate, said converter further including a third group of first, second and third AND gates for receiving still other bits of numerical information and having their outputs connected to a fourth OR gate, said converter still further including a fourth group of first and second AND gates for receiving selected bits of information fed to said second and third groups and also one other bit not fed to said latter-mentioned groups, said AND gates of said fourth group having their outputs connected to a fifth OR gate, and said converter also being adapted to subtract the number six from each digit of said sum output in the absence of said carry signal at the output of said binary adder and to add the number zero when said carry signal is present, whereby an answer is provided at the output of said converter.

6. The invention described in claim 5 wherein said binary adder further includes a carry signal detector for providing said carry signal.

References Cited

UNITED STATES PATENTS

| | | | |
|---|---|---|---|
| 2,989,237 | 6/1961 | Duke | 235—169 |
| 2,991,009 | 7/1961 | Edwards | 235—169 |
| 3,089,644 | 5/1963 | Wemby | 235—169 |
| 3,278,734 | 10/1966 | Ulbrich et al. | 235—169 |
| 3,304,418 | 2/1967 | Perotto et al. | 235—169 |

MALCOLM A. MORRISON, *Primary Examiner.*

M. J. SPIVAK, *Assistant Examiner.*